US011376786B2

(12) United States Patent
Feller et al.

(10) Patent No.: US 11,376,786 B2
(45) Date of Patent: Jul. 5, 2022

(54) METHODS AND APPARATUS FOR ADDITIVE MANUFACTURING

(71) Applicant: Carbon, Inc., Redwood City, CA (US)

(72) Inventors: Bob E. Feller, Mountain View, CA (US); Jason P. Rolland, San Carlos, CA (US); Joseph M. DeSimone, Monte Sereno, CA (US)

(73) Assignee: Carbon, Inc., Redwood City, CA (US)

( * ) Notice: Subject to any disclaimer, the term of this patent is extended or adjusted under 35 U.S.C. 154(b) by 1013 days.

(21) Appl. No.: 15/934,301

(22) Filed: Mar. 23, 2018

(65) Prior Publication Data

US 2018/0304526 A1    Oct. 25, 2018

Related U.S. Application Data

(60) Provisional application No. 62/488,168, filed on Apr. 21, 2017.

(51) Int. Cl.
*B29C 64/135* (2017.01)
*B29C 64/188* (2017.01)
(Continued)

(52) U.S. Cl.
CPC ......... *B29C 64/135* (2017.08); *B29C 64/129* (2017.08); *B29C 64/188* (2017.08);
(Continued)

(58) Field of Classification Search
CPC .... B29C 64/188; B29C 64/245; B29C 64/232
See application file for complete search history.

(56) References Cited

U.S. PATENT DOCUMENTS 4,511,392 A    4/1985    Rorer
4,603,712 A    8/1986    Krause
(Continued)

FOREIGN PATENT DOCUMENTS

DE    102014102137 A1    8/2015
WO    2016/149151        9/2016

OTHER PUBLICATIONS

"Polyethylene Glycol Diacrylate" http://www.chemicalland21.com/industrialchem/functional%20Monomer/POLYETHYLENE%20GLYCOL%20DIACRYLATE.htm (Year: 2021).*
(Continued)

*Primary Examiner* — Michael M. Robinson
(74) *Attorney, Agent, or Firm* — Myers Bigel, P.A.

(57) ABSTRACT

Provided herein is an apparatus for producing three-dimensional objects by additive manufacturing, which may include: (a) optionally a window permeable to an inhibitor of polymerization; (b) a window mount to which the window is secured when the window is present; (c) optionally a carrier platform on which the three-dimensional object can be produced; (d) a carrier platform mount operatively associated with the window mount; (e) a drive assembly operatively associated with the window mount and the carrier platform mount; (f) a light source operatively associated with the window mount operatively associated with a patterning array; (g) an inhibitor of polymerization supply configured for operative association with the feed surface when present; and (h) at least one or two reactant supplies configured for operative association with the feed surface when present. Methods of making a three-dimensional object from a polymerization liquid that may use such apparatus are also provided.

21 Claims, 1 Drawing Sheet

(51) Int. Cl.
  *B33Y 10/00* (2015.01)
  *B29C 64/255* (2017.01)
  *B29C 64/245* (2017.01)
  *B29C 64/232* (2017.01)
  *B29C 64/264* (2017.01)
  *B29C 64/321* (2017.01)
  *B33Y 40/00* (2020.01)
  *B33Y 70/00* (2020.01)
  *B29C 64/379* (2017.01)
  *B29C 64/129* (2017.01)
  *B29K 75/00* (2006.01)
  *B29K 105/00* (2006.01)
  *B29K 105/16* (2006.01)
  *B29C 64/35* (2017.01)
  *B33Y 30/00* (2015.01)

(52) U.S. Cl.
  CPC .......... *B29C 64/232* (2017.08); *B29C 64/245* (2017.08); *B29C 64/255* (2017.08); *B29C 64/264* (2017.08); *B29C 64/321* (2017.08); *B29C 64/379* (2017.08); *B33Y 10/00* (2014.12); *B33Y 30/00* (2014.12); *B33Y 40/00* (2014.12); *B33Y 70/00* (2014.12); *B29C 64/35* (2017.08); *B29K 2075/00* (2013.01); *B29K 2105/0002* (2013.01); *B29K 2105/0032* (2013.01); *B29K 2105/0058* (2013.01); *B29K 2105/16* (2013.01)

(56) References Cited

U.S. PATENT DOCUMENTS

| | | |
|---|---|---|
| 4,882,394 A | 11/1989 | Kreiner |
| 5,236,637 A | 8/1993 | Hull |
| 5,391,072 A | 2/1995 | Lawton et al. |
| 5,529,473 A | 6/1996 | Lawton et al. |
| 5,922,811 A | 7/1999 | Suzuki et al. |
| 6,713,125 B1 | 3/2004 | Sherwood |
| 7,438,846 B2 | 10/2008 | John |
| 7,892,474 B2 | 2/2011 | Shkolnik et al. |
| 8,110,135 B2 | 2/2012 | El-Siblani |
| 8,436,098 B2 | 5/2013 | Dittrich et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,410,027 B2 | 8/2016 | Säwe et al. |
| 9,453,142 B2 | 9/2016 | Rolland et al. |
| 9,550,906 B2 | 1/2017 | Chen et al. |
| 9,598,606 B2 | 3/2017 | Rolland et al. |
| 2013/0292862 A1 | 11/2013 | Joyce |
| 2013/0295212 A1 | 11/2013 | Chen et al. |
| 2015/0097316 A1* | 4/2015 | DeSimone .............. B29C 64/40 264/401 |
| 2016/0136889 A1 | 5/2016 | Rolland et al. |
| 2016/0137838 A1 | 5/2016 | Rolland et al. |
| 2016/0137839 A1* | 5/2016 | Rolland ................. B33Y 50/02 522/81 |
| 2016/0160077 A1 | 6/2016 | Rolland et al. |
| 2016/0200052 A1 | 7/2016 | Moore et al. |

OTHER PUBLICATIONS

"Methyl methacrylate" https://en.wikipedia.org/wiki/Methyl_methacrylate (Year: 2021).*

International Search Report and Written Opinion corresponding to PCT/US2017/062135; dated Feb. 28, 2018 (13 pages).

Tumbleston J et al. Continuous liquid interface production of 3D objects. Science. Mar. 16, 2015; 347: 1340-1352.

Janusziewicz R et al. Layerless fabrication with continuous liquid interface production. Proc Natl Acad Sci USA. Oct. 18, 2016; 113(42): 11703-11708.

* cited by examiner

METHODS AND APPARATUS FOR ADDITIVE MANUFACTURING

FIELD OF THE INVENTION

The present invention concerns additive manufacturing in general, and particularly concerns methods and apparatus for bottom-up stereolithography techniques such as continuous liquid interface production.

BACKGROUND OF THE INVENTION

In conventional additive or three-dimensional fabrication techniques, construction of a three-dimensional object is performed in a step-wise or layer-by-layer manner. Typically, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. Unfortunately, such techniques have generally been limited to prototyping, as the products made often had poor tensile properties.

Recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., U.S. Pat. Nos. 9,211,678; 9,205,601; and 9,216,546 (see also J. Tumbleston, et al., *Continuous liquid interface production of 3D Objects, Science* 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016)).

More recently, dual cure stereolithography resins suitable for stereolithography techniques (particularly for CLIP) are described in J. Rolland et al., U.S. Pat. No. 9,453,142, and US Patent Application Publication Nos. US 2016/0136889, US 2016/0137838 and US 2016/0160077. These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

These two recent developments have made it possible for additive manufacturing to move beyond prototyping, to the production of functional parts with tensile properties (e.g., strength, durability, flexibility) suitable for real-world use. With such expanding opportunities for production, there is a need for still additional developments that further enhance various sub-categories of such methods and products.

SUMMARY OF THE INVENTION

A first aspect of the invention is an apparatus for producing three-dimensional objects by additive manufacturing. The apparatus includes:

(a) optionally a window (e.g., a fluoropolymer window), the window permeable to an inhibitor of polymerization, the window having a build surface on which the three-dimensional object is produced, and a feed surface separate from the build surface;

(b) a window mount to which the window is secured (e.g., releasably secured) when the window is present;

(c) optionally a carrier platform on which the three-dimensional object can be produced;

(d) a carrier platform mount operatively associated with the window mount, the carrier platform mount configured to releasably secure a carrier platform on which the three-dimensional object may be produced;

(e) a drive assembly (e.g., an elevator assembly) operatively associated with the window mount and the carrier platform mount, the drive assembly configured to advance the window mount and the platform mount away from one another;

(f) a light source operatively associated with the window mount (e.g., illumination source (e.g., an ultraviolet laser) operatively associated with a patterning array (e.g., a liquid crystal display panel or a digital micromirror device));

(g) an inhibitor of polymerization supply configured for operative association with the feed surface when present, the two configured to deliver an inhibitor of polymerization through the window to the build surface; and (h) at least one or two reactant supplies configured for operative association with the feed surface when present, and with the two configured to deliver the reactant through the window to the build surface (e.g., with a valve independently operatively associated with each reactant supply).

Also provided is a method of making a three-dimensional object from a polymerization liquid by (a) providing a carrier platform, a window, and an inhibitor of polymerization (e.g., oxygen), with said carrier and said window defining a build region therebetween, and with said window permeable to said inhibitor; (b) filling said build region with said polymerization liquid; and (c) irradiating said build region with light while advancing said carrier platform and said window away from one another and also supplying inhibitor of polymerization through said window, to thereby form said three-dimensional object from said polymerization liquid by light polymerization (e.g., in a free-radical polymerization reaction) while maintaining a liquid film release layer comprised of said polymerization liquid and said inhibitor between said window and said three-dimensional object; said method comprising: at least periodically delivering at least one reactant through said window into said polymerization liquid and into said three-dimensional object during said irradiating and advancing step (c).

Further provided is a method of making a three-dimensional object, comprising: (a) providing a carrier platform, a window, at least one reactant (e.g., at least one volatile reactant such as ethylene, propylene, chloroprene, a diene, or a combination thereof), and an inhibitor of polymerization (e.g., oxygen), with said carrier platform and said window defining a build region therebetween, and with said window permeable to said inhibitor and said at least one reactant; (b) filling said build region with a solvent for polymerization; and (c) irradiating said build region with light while advancing said carrier platform and said window away from one another and also supplying both said at least one reactant and said inhibitor of polymerization through said window, to thereby form said three-dimensional object from said reactant by light polymerization (e.g., in a free-radical polymerization) while maintaining a liquid film release layer comprised of said solvent and said inhibitor between said window and said three-dimensional object; then (d) optionally, but in some embodiments preferably, washing said object; and then (e) optionally, but in some embodiments preferably, further curing or vulcanizing said object (e.g., by heating, and/or peroxide vulcanization).

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Polymerizable Liquids.

In the present invention, the polymerizable liquid is modified or prepared, in whole or in part, in situ on the build surface or "window," with at least one reactant delivered through the window, as noted above and discussed further below. Examples of suitable resins include, but are not limited to, those set forth in J. DeSimone et al., U.S. Pat. Nos. 9,211,678; 9,205,601; and 9,216,546, and also in U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al.

In some embodiments, dual cure polymerizable liquids are preferred. Examples include but are not limited to those set forth in J. Rolland et al., U.S. Pat. Nos. 9,598,606 and 9,453,142, and in US Patent Application Pub. Nos. US 2016/0136889 and US 2016/0160077. In general, such resins can comprise: (a) light-polymerizable monomers and/or prepolymers that can form an intermediate object (typically in the presence of a photocatalyst); and (b) heat-polymerizable monomers and/or prepolymers. As noted above, in some embodiments, these constituents may be supplemented, and/or replaced with, (c) thermoplastic particles and/or (d) Diels-Alder adducts. Each of these constituents is discussed further below.

A. Light-Polymerizable Monomers and/or Prepolymers.

Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of reactive end groups suitable for Part A constituents, monomers, or prepolymers include, but are not limited to: acrylates, methacrylates, $\alpha$-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

B. Heat-Polymerizable Monomers and/or Prepolymers.

Sometimes also referred to as "Part B", these constituents may comprise, consist of or consist essentially of a mix of monomers and/or prepolymers that possess reactive end groups that participate in a second solidification reaction after the Part A solidification reaction. In general, for dual cure resins, examples of methods used to solidify Part B include, but are not limited to, contacting the object or scaffold to heat, water or water vapor, light at a different wavelength than that at which Part A is cured, catalysts (with or without additional heat), evaporation of a solvent from the polymerizable liquid (e.g., using heat, vacuum, or a combination thereof), microwave irradiation, etc., including combinations thereof. In this case, heat curing of the "Part B" resins is preferred.

Examples of reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/azide (also known as one embodiment of "Click Chemistry," along with additional reactions including thiolene, Michael additions, Diels-Alder reactions, nucleophilic substitution reactions, etc.), alkene/Sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), Perfluorovinyl (coupling to form perfluorocyclobutane), etc., where *isocyanates include protected isocyanates (e.g., oximes), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

C. Thermoplastic Particles.

Thermoplastic polymer particles as used herein are those that are not initially soluble in the polymerizable liquid, but can be dispersed in the liquid below the dissolution temperature thereof. "Insoluble" as used herein refers to both completely insoluble polymer particles, and poorly soluble particles which dissolve so slowly that they can be dispersed in the resin without dissolving to such an extent that they cannot be light polymerized as particles in the resin during production of a three-dimensional intermediate. Thus, the particles may be initially dispersed rather than dissolved for any reason, including but not limited to inherently immiscibility/insolubility, Upper Critical Solution Temperature (UCST), crystallization, encapsulation in a shell which melts/degrades at high temperatures (e.g., wax melt, crystal melt, hydrogen bonding, degradation at high temperature, etc.).

Optionally, but in some embodiments preferably, the thermoplastic polymer from which the particles are formed may include terminal function or reactive groups. Suitable functional or reactive groups include, but are not limited to, amine, phenol, maleimide, and carboxyl groups. Such reactive groups may be included for any of a variety of purposes, including but not limited to promoting compatibility and adhesion between matrices, such as: the first and second curable components of the dual cure system, and the thermoplastics, may react with thermosettable component or UV curable component to form stable linkages, may react with thermosettable components or UV curable component transiently, to control domain size and morphology of phase-separated thermoplastic, may catalyze cure of thermosettable components, acting as a latent catalyst (especially amine-terminated with epoxy and cyanate ester), etc.

In general, the thermoplastic particles have an average diameter of from 0.5 to 10, 20, or 50 microns. They may be prepared from a thermoplastic polymer by any suitable technique, including but not limited to mechanical grinding, cryo milling, spray drying, coagulation, etc., along with sieving or other techniques known to those skilled in the art.

D. Additional Resin Ingredients.

Photoinitiators included in the polymerizable liquid (resin) can be any suitable photoiniator, including type I and type II photoinitiators and including commonly-used UV photoinitiators, examples of which include but are not limited to acetophenones (diethoxyacetophenone for example), phosphine oxides diphenyl(2,4,6-trimethylbenzoyl)phosphine oxide, phenylbis(2,4,6-trimethylbenzoyl) phosphine oxide (PPO), Irgacure® 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 m average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners:

Additional components (hardeners) can be used. Any suitable hardener may be used (see, e.g., U.S. Pat. Nos. 5,599,856; 6,656,979; 8,632,654; and 9,315,698). In some embodiments; the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide; a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3, 5-triazine-2,4,6-(1H,3H,5H)-trione.

In some embodiments, the hardener comprises a latent hardener (including mixtures thereof); that is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 1,2- or 1,3- or 1,4-benzenediamines, bis(4-aminophenyl)-1, 4-diisopropylbenzene (e.g., EPON 1061 from Shell), bis(4-amino-3,5-dimethylphenyl)-1,4-diisopropylbenzene (e.g. EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis (2,6-diethylaniline) (e.g., LONZACURE® M-DEA from Lonza), methylenebis(2-isopropyl-6-methylaniline) (e.g., LONZACURE® M-MIPA from Lonza), methylenebis(2,6-diisopropylaniline) (e.g., LONZACURE® M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2', 4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis (N,N-dimethylcarbamide) (see, e.g., U.S. Pat. No. 3,386, 955); and aliphatic or cycloaliphatic diamines and polyamines if they are sufficiently unreactive. An example which may be mentioned here is polyetheramines, e.g., JEFFAMINE® 230 and 400. Aliphatic or cycloaliphatic diamines or polyamines whose reactivity has been reduced by steric and/or electronic influencing factors or/and are sparingly soluble or have a high melting point, e.g. JEFF-LINK® 754 (Huntsman) or CLEARLINK 1000 (Dorf Ketal) can also be used.

Dyes/Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS®1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (m) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

In some embodiments, the dual cure resin can be a Carbon, Inc. rigid polyurethane resin (RPU), flexible polyurethane resin (FPU), or elastomeric polyurethane resin (EPU), available from Carbon, Inc., 1089 Mills Way, Redwood City, Calif. 94063 USA.

2. Additive Manufacturing Methods and Apparatus.

In the present invention, the object is preferably formed by continuous liquid interface production (CLIP). CLIP is known and described in, for example, U.S. Pat. Nos. 9,211,678; 9,205,601; and 9,216,546; and in J. Tumbleston et al., Continuous liquid interface production of 3D Objects, *Science* 347, 1349-1352 (published online 16 Mar. 2015) and R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments, the additive manufacturing apparatus can be a Carbon, Inc. M1 or M2 apparatus implementing continuous liquid interface production, available from Carbon, Inc., 1089 Mills Way, Redwood City, Calif. 94063 USA, modified as further described below.

Figure 1:
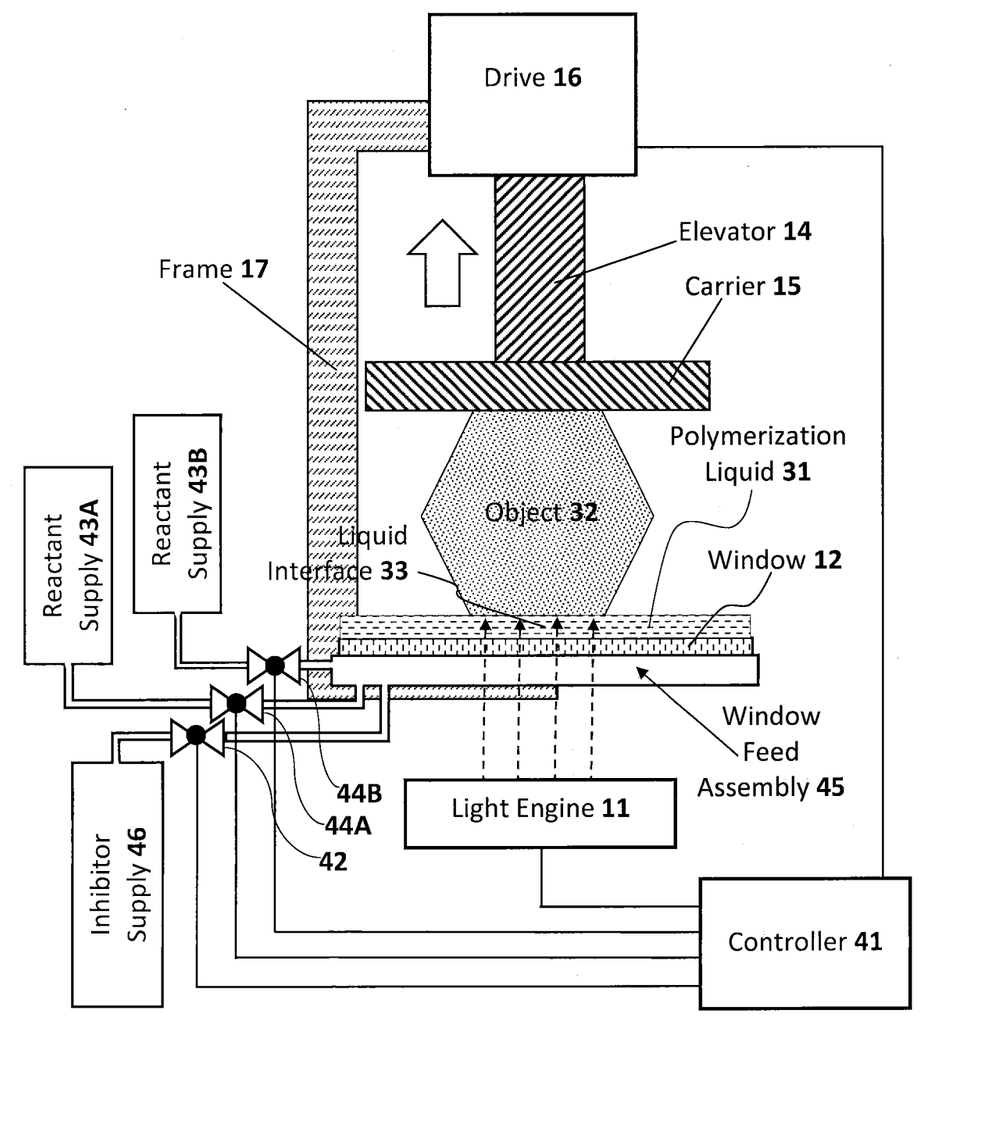
FIG. 1 schematically illustrates an apparatus useful for carrying out the present invention.

An apparatus useful for carrying out the present invention is schematically illustrated in FIG. 1. In general, the apparatus comprises a light engine 11, a (generally removable) optically transparent window 12, an elevator 14, a (generally removable) carrier plate 15, and a drive 16, with a frame or chassis 17 interconnecting the drive and the window, and supporting other components (not shown). In the illustrated embodiment, while the drive is positioned to elevate the carrier, the converse arrangement may also be used, with the carrier being stationary, and the window being lowered away from the carrier. Releasable mounting mechanisms (e.g., slide-in slots, drop-in frames, all with or without associated locks, detents, gates, and/or alignment features) may be included on the frame and/or elevator to facilitate the installation and removal of a window (typically in the form of a cassette with a frame) and of the carrier platform.

The window is permeable to inhibitors of polymerization (e.g., oxygen) and also permeable to additional reactants such as described above. The window may be comprised of any suitable semipermeable material, but is preferably comprised of a fluoropolymer such as an amorphous fluoropolymer (e.g., TEFLON AF® amorphous fluoropolymer), optionally with support structures therebeneath.

The light engine 11 and drive 16 are typically operatively associated with a controller 41, which may, for example, be a general purpose computer running appropriate software, with appropriate interfaces. But, any suitable architecture can be employed with the controller being local, remote, on the cloud, or any combination thereof.

Any suitable light engine 11 may be used, such as an illumination source (e.g., an ultraviolet laser, led, or array thereof) operatively associated with a patterning array (e.g., a liquid crystal display panel or a digital micromirror device).

An inhibitor supply 46 may be operatively associated with a window feed assembly 45 through a valve 42, with the valve controlled by controller 41. In like manner, a first reactant supply 43A and an optional second reactant supply 43B may be operatively associated with the window feed assembly 45 through valves 44A and 44B, respectively, again under the control of the controller 41. The inhibitor supply 46 may, in a preferred embodiment, be compressed air, air enriched with oxygen (such as via an oxygen generator) or any other suitable oxygen source. The reactant supplies 43A, 43B may be reactants in liquid or gas (typically compressed gas) form. The reactants and the inhibitor may independently be supplied to the window feed assembly in gas form or in liquid form (e.g., in an oxygen carrying liquid such as a perfluorocarbon liquid). The window feed assembly 45 may be structured in any way that permits the inhibitor and the reactants to pass from the "feed side" through the "build side" of the window, such as an enlarged cavity or space, an array of channels, a textured surface on an optically transparent support plate (texturing allowing sufficient gas travel between the window and the support plate), etc. The window 12 and the window feed assembly 45 may be combined together in the form of a removable "cassette" with a surrounding frame (not shown), the frame defining a well for receiving polymerization liquid, with appropriate connections to inhibitor and reactant supplies, so that the window cassette can be readily exchanged from the apparatus as described above.

In use, a polymerization liquid 31 (e.g., a partial or complete polymerizable liquid, a solvent to be enriched with monomer through the window, etc.) is placed as a pool on top of the window 12, and an object 32 produced from that pool at a sustained or continuous liquid interface 33 between and contacting the two, as noted above.

3. Methods and Reactants for Delivery Through Window.

In Situ Modification of Polymerizable Liquid.

A first aspect of the invention is a method of making a three-dimensional object from a polymerization liquid by (a) providing a carrier platform, a window, and an inhibitor of polymerization (e.g., oxygen), with the carrier and the window defining a build region therebetween, and with the window permeable to the inhibitor; (b) filling the build region with the polymerization liquid; and (c) irradiating the build region with light while advancing the carrier platform and the window away from one another and also supplying an inhibitor of polymerization through the window, to thereby form the three-dimensional object from the polymerization liquid by light polymerization (e.g., in a free-radical polymerization reaction) while maintaining a liquid film release layer comprised of the polymerization liquid and the inhibitor between the window and the three-dimensional object. The method includes at least periodically delivering at least one reactant through the window into the polymerization liquid and into the three-dimensional object during the irradiating and advancing step (c).

In some embodiments of the foregoing, the at least one reactant comprises a monomer or co-monomer of the light polymerization.

In some embodiments of the foregoing, the polymerization liquid comprises: (i) a photoinitiator; (ii) optionally, but in some embodiments preferably, at least one light polymerizable monomer or prepolymer; (iii) optionally, but in some embodiments preferably, at least one heat polymerizable monomer or prepolymer; (iv) optionally, but in some embodiments preferably, at least one pigment or dye; (v) optionally, but in some embodiments preferably, a diluent; and (vi) optionally, but in some embodiments preferably, at least one filler.

In some embodiments of the foregoing, the at least one reactant comprises a heat polymerizable monomer or co-monomer.

In some embodiments of the foregoing, the polymerization liquid comprises a dual cure (e.g., light polymerizable followed by heat polymerizable) polyurethane resin, and the co-reactant comprises ethylene or propylene (e.g., delivered in an amount sufficient to inhibit shrinkage of at least a portion of the object, and/or alter the tensile properties of a portion of, or all of, the object).

In some embodiments of the foregoing, the polymerization liquid is nonaqueous.

In some embodiments of the foregoing: (i) the reactant has a vapor pressure of at least 40, 60, 100, or 200 mmHg; and/or (ii) the reactant has a molar mass of not more than 200 or 100 g/mol.

In some embodiments of the foregoing, the reactant comprises: carbon monoxide, sulfur dioxide, an alkene (e.g. ethylene, propylene, vinyl fluoride, vinyl chloride, a diene (e.g., 1,3-butadiene), allyl chloride, allyl bromide, allyl iodide, allyl alcohol, etc.), an alkyne (e.g., acetylene, a propargyl compounds, etc.), methyl methacrylate, acrylonitrile, or a combination thereof.

In some embodiments of the foregoing, the step of at least periodically delivering at least one reactant is temporally modulated during the irradiating and advancing step (c).

In some embodiments of the foregoing, the irradiating and advancing step (c) is carried out under conditions in which at least a portion of the object is produced in a layerless manner (e.g., by continuous liquid interface production).

In some embodiments of the foregoing, the method further includes the steps of: (d) optionally washing the object; and then (e) further curing the object (e.g., by heating).

In Situ Preparation of Polymerizable Liquid.

Another aspect of the invention is a method of making a three-dimensional object, comprising:

(a) providing a carrier platform, a window, at least one reactant (e.g., at least one volatile reactant such as ethylene, propylene, chloroprene, a diene, or a combination thereof), and an inhibitor of polymerization (e.g., oxygen), with the carrier platform and the window defining a build region therebetween, and with the window permeable to the inhibitor and the at least one reactant;

(b) filling the build region with a polymerization liquid that is a solvent for polymerization; and (c) irradiating the build region with light while advancing the carrier platform and the window away from one another and also supplying both the at least one reactant and the inhibitor of polymerization through the window, to thereby form the three-dimensional object from the reactant by light polymerization (e.g., in a free-radical polymerization) while maintaining a liquid film release layer comprised of the solvent and the inhibitor between the window and the three-dimensional object; then (d) optionally, but in some embodiments preferably, washing the object; and then (e) optionally, but in some embodiments preferably, further curing or vulcanizing the object (e.g., by heating, and/or peroxide vulcanization).

In some embodiments, the step of supplying at least one reactant through the window comprises supplying at least a first reactant and a second reactant through the window (optionally with the supply of each of the first and second reactant independently temporally modulated during the irradiating and advancing step (c)).

In some embodiments of the foregoing, the solvent for polymerization has a boiling point of at least 130, 150 or 170 degrees Centigrade.

In some embodiments of the foregoing, the solvent for polymerization comprises a polar or non-polar organic solvent (e.g., tripropylene glycol (mono) methyl ether (TPM), dimethyl adipate, or propylene glycol).

In some embodiments of the foregoing, the solvent for polymerization further comprises: (a) a photoinitiator; (b) optionally, but in some embodiments preferably, a diene (e.g., dicyclopentadiene, ethylidene norbornene, vinyl norbornene, etc., including combinations thereof (e.g., for the production of a EPDM rubber); (c) optionally, but in some embodiments preferably, a vulcanizing agent (e.g., a sulfur vulcanizing agent; a metal oxide such as MgO, ZnO, or PbO for vulcanization of polychloroprene; a peroxide compound, etc.); (d) optionally, but in some embodiments preferably, a vulcanization accelerator, a vulcanization activator, and/or a vulcanization retarder; and (e) optionally, but in some embodiments preferably, a vulcanization coagent.

In some embodiments of the foregoing, the solvent for polymerization is nonaqueous.

In some embodiments of the foregoing, the irradiating and advancing step (c) is carried out under conditions in which at least a portion of the object is produced in a layerless manner (e.g., by continuous liquid interface production).

In some embodiments of the foregoing: (i) each of the reactants has a vapor pressure of at least 40, 60, 100, or 200 mmHg; and/or (ii) each of the reactants has a molar mass of not more than 200 or 100 g/mol.

4. Post-Production Steps.

Washing.

After the intermediate object is formed, it is optionally washed (e.g., with an organic solvent), optionally dried (e.g., air dried) and/or rinsed (in any sequence).

Solvents for washing (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluoroether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Any suitable cleaning apparatus may be used, including but not limited to those described in U.S. Pat. Nos. 5,248, 456; 5,482,659, 6,660,208; 6,996,245; and 8,529,703. A preferred cleaning apparatus is the Smart Part Washer available from Carbon, Inc., 1089 Mills Way, Redwood City, Calif. 94063 USA.

In some embodiments employing "dual cure" polymerizable liquids, a constituent or reactant of the second cure may optionally be included in the wash liquid, so that the constituent penetrates into or swells the object with that constituent prior to the further curing step.

Further Curing.

While further (or second) curing may be carried out by any suitable technique, including but not limited to those described in U.S. Pat. No. 9,453,142, in a preferred embodiment the further curing is carried out by heating.

Heating may be active heating (e.g., in an oven, such as an electric, gas, solar oven or microwave oven, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

Ovens may be batch or continuous (conveyor) ovens, as is known in the art. Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

Vulcanization.

Depending on the particular polymer material or materials from which the object is made, in some embodiments the subsequent curing step can be described as a vulcanizing step. Numerous different techniques for vulcanization are known and can be used, depending on the type of materials made. Constituents required for vulcanization can be added to the polymerization liquid as appropriate for the particular material made. Numerous different constituents are known or will be apparent to those skilled in the art. See, e.g., U.S. Pat. Nos. 9,550,906; 9,410,027; 8,436,098; 5,922,811; 4,882,394; 4,511,392; and 4,603,712.

The foregoing is illustrative of the present invention, and is not to be construed as limiting thereof. The invention is defined by the following claims, with equivalents of the claims to be included therein.

We claim:

1. A method of making a three-dimensional object from a polymerization liquid by:
   (a) providing a carrier platform, a window, and an inhibitor of polymerization, with said carrier and said window defining a build region therebetween, and with said window permeable to said inhibitor;
   (b) filling said build region with said polymerization liquid; and
   (c) irradiating said build region with light while advancing said carrier platform and said window away from one another and also supplying said inhibitor of polymerization through said window, to thereby form said three-dimensional object from said polymerization liquid by light polymerization while maintaining a liquid film release layer comprised of said polymerization liquid and said inhibitor between said window and said three-dimensional object;
   said method comprising:
   at least periodically delivering at least one reactant through said window into said polymerization liquid and into said three-dimensional object during said irradiating and advancing step (c),
   wherein the method further comprises providing a window feed assembly coupled to said window, and wherein said inhibitor of polymerization and said at least one reactant are supplied by said window feed assembly to be delivered through said window.

2. The method of claim 1, wherein said reactant comprises a monomer or co-monomer used in said light polymerization.

3. The method of claim 1, wherein said polymerization liquid comprises:
   (i) a photoinitiator;
   (ii) optionally, at least one light polymerizable monomer or prepolymer;
   (iii) optionally, at least one heat polymerizable monomer or prepolymer;
   (iv) optionally, at least one pigment or dye;
   (v) optionally, a diluent; and
   (vi) optionally, at least one filler.

4. The method of claim 1, wherein said reactant comprises a heat polymerizable monomer or co-monomer.

5. The method of claim 1, wherein said polymerization liquid comprises a dual cure polyurethane resin, and said at least one reactant comprises ethylene or propylene.

6. The method of claim 1, wherein said polymerization liquid is nonaqueous.

7. The method of claim 1, wherein: (i) said reactant has a vapor pressure of at least 40 mmHg; and/or (ii) said reactant has a molar mass of not more than 200 g/mol.

8. The method of claim 1, wherein said reactant comprises: carbon monoxide, sulfur dioxide, an alkene, an alkyne, methyl methacrylate, acrylonitrile, or a combination thereof.

9. The method of claim 1, wherein said step of at least periodically delivering at least one reactant is temporally modulated during said irradiating and advancing step (c).

10. The method of claim 1, wherein said inhibitor comprises oxygen.

11. The method of claim 1, wherein said irradiating and advancing step (c) is carried out under conditions in which at least a portion of said object is produced in a layerless manner.

12. The method of claim 1, further comprising the steps of:
   (d) optionally washing said object; and then
   (e) further curing said object.

13. A method of making a three-dimensional object, comprising:
   (a) providing a carrier platform, a window, at least one reactant, and an inhibitor of polymerization, with said carrier platform and said window defining a build region therebetween, and with said window permeable to said inhibitor and said at least one reactant;
   (b) filling said build region with a solvent for polymerization; and
   (c) irradiating said build region with light while advancing said carrier platform and said window away from one another and also supplying both said at least one reactant and said inhibitor of polymerization through said window, to thereby form said three-dimensional object from said reactant by light polymerization while maintaining a liquid film release layer comprised of said solvent and said inhibitor between said window and said three-dimensional object; then
   (d) optionally, washing said object; and then
   (e) optionally, further curing or vulcanizing said object,
   wherein the method further comprises providing a window feed assembly coupled to said window, and wherein said inhibitor of polymerization and said at least one reactant are supplied by said window feed assembly to be delivered through said window.

14. The method of claim 13, wherein said step of supplying at least one reactant through said window comprises supplying at least a first reactant and a second reactant through said window, optionally with the supply of each said first and second reactant independently temporally modulated during said irradiating and advancing step (c).

15. The method of claim 13, wherein said solvent for polymerization has a boiling point of at least 130 degrees Centigrade.

16. The method of claim 13, wherein said solvent for polymerization comprises a polar or non-polar organic solvent.

17. The method of claim 13, wherein said solvent for polymerization further comprises:
   (i) a photoinitiator;
   (ii) optionally, a diene;
   (iii) optionally, a vulcanizing agent;
   (iv) optionally, a vulcanization accelerator, a vulcanization activator, and/or a vulcanization retarder; and
   (v) optionally, a vulcanization coagent.

18. The method of claim 13, wherein said solvent for polymerization is nonaqueous.

19. The method of claim 13, wherein said inhibitor comprises oxygen.

20. The method of claim 13, wherein said irradiating and advancing step (c) is carried out under conditions in which at least a portion of said object is produced in a layerless manner.

21. The method of claim 13, wherein: (i) each said reactant has a vapor pressure of at least 40 mmHg; and/or (ii) each said reactant has a molar mass of not more than 200 g/mol.

\* \* \* \* \*

UNITED STATES PATENT AND TRADEMARK OFFICE
CERTIFICATE OF CORRECTION

PATENT NO. : 11,376,786 B2
APPLICATION NO. : 15/934301
DATED : July 5, 2022
INVENTOR(S) : Feller et al.

It is certified that error appears in the above-identified patent and that said Letters Patent is hereby corrected as shown below:

In the Specification

Column 5, Line 55: Please correct "20 m" to read --20 µm--

Column 7, Line 42: Please correct "(m)" to read --(µm)--

Signed and Sealed this
Seventeenth Day of October, 2023

Katherine Kelly Vidal
*Director of the United States Patent and Trademark Office*